United States Patent

[11] 3,571,601

[72] Inventor Tadao Kohashi
    Yokohama, Japan
[21] Appl. No. 765,891
[22] Filed Oct. 8, 1968
[45] Patented Mar. 23, 1971
[73] Assignee Matsushita Electric Industrial Co. Ltd.
    Osaka, Japan
[32] Priority Oct. 13, 1967, Nov. 7, 1967
[33] Japan
[31] 42/66764 and 42/72331

[54] PHASE-SHIFTING BRIDGE HAVING PHOTOCELLS AND ELECTROLUMINESCENT ELEMENTS
    4 Claims, 2 Drawing Figs.
[52] U.S. Cl. .................................... 250/210,
    250/205, 250/206, 250/208, 250/209
[51] Int. Cl. ................................................ H01j 39/12
[50] Field of Search .................................. 250/205,
    206, 208, 209, 210; 315/149, 150, 151, 155, 227

[56] References Cited
UNITED STATES PATENTS
3,002,099  9/1961  Gregory et al. ............... 250/205
3,248,549  4/1966  Sanabria ........................ 250/210

Primary Examiner—James W. Lawrence
Assistant Examiner—Martin Abramson
Attorney—Stevens, Davis, Miller & Mosher ABSTRACT: An energy-sensitive luminescent device having means including an energy-sensitive element whose impedance is variable depending on an energy signal applied thereto so that a variation in the impedance thereof can be utilized for shifting the phase of an AC voltage applied from an AC voltage supply to an electrically luminescent element, and means for detecting the variation in the phase of the waveform of the luminous output from the electrically luminescent element as a variation in the luminous intensity.

INVENTOR
TADAO KOHASHI

3,571,601

PHASE-SHIFTING BRIDGE HAVING PHOTOCELLS AND ELECTROLUMINESCENT ELEMENTS

This invention relates to an energy-sensitive luminescent device which includes therein an electrically luminescent element luminescing depending on the strength of an electric field applied thereto and in which the phase of the waveform of the luminous output from the electrically luminescent element is shifted depending on an energy signal input so as to suitably control the luminous output from the electrically luminescent element.

It is an object of the present invention to provide an energy-sensitive luminescent device which comprises an electrically luminescent element, an AC voltage supply for applying an AC voltage to said electrically luminescent element, and means including an energy-sensitive element connected with said AC voltage supply, said energy-sensitive element having such a property that either the resistance or reactance thereof is variable depending on an energy signal applied thereto so that a variation in the impedance thereof can be utilized for shifting the phase of the AC voltage applied to said electrically luminescent element.

Figure 1:
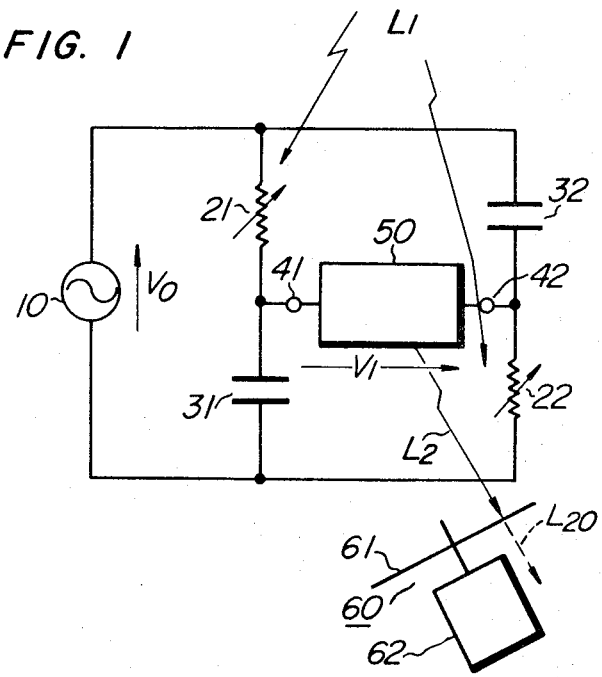
Figure 2:
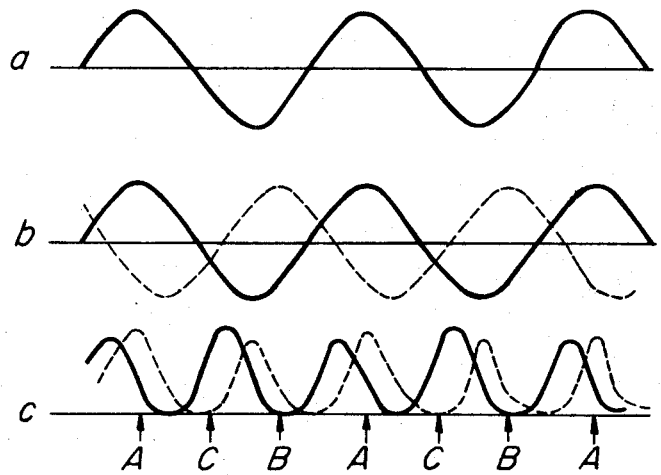
Figure 3:
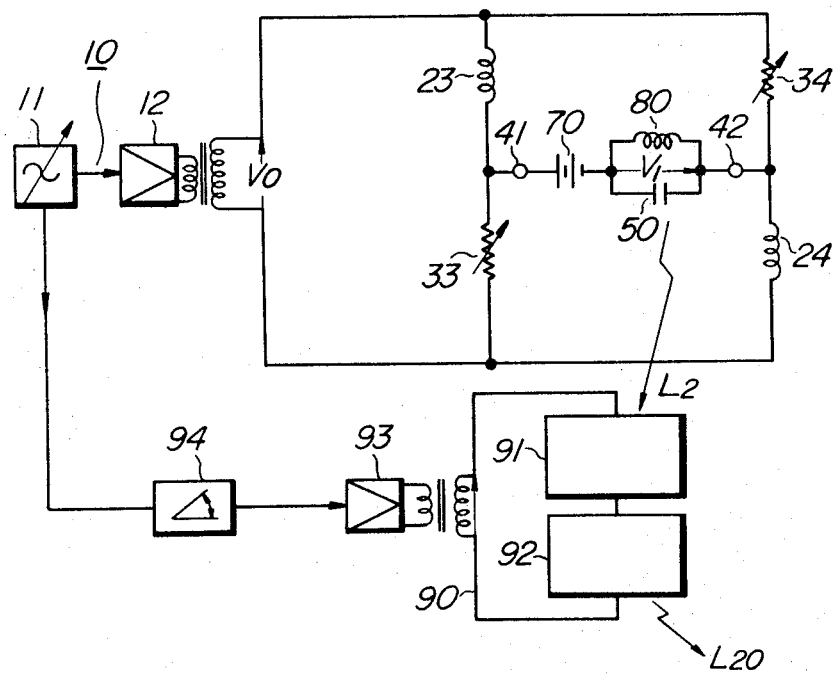

The above and other objects, features and advantages of the present invention will be apparent from the following description taken in conjunction with the accompanying drawings, in which:

FIG. 1 is an electrical connection diagram of an embodiment of the energy-sensitive luminescent device according to the present invention the view also showing means for detecting the luminous output from an electrically luminescent element;

FIG. 2 is a graphic illustration of the operation of the device shown in FIG. 1; and FIG. 3 is an electrical connection diagram of another embodiment of the present invention and a block diagram of means for detecting the luminous output from an electrically luminescent element. Referring to FIG. 1 showing an equivalent circuit of an embodiment of the present invention, the energy-sensitive luminescent device comprises an AC voltage supply 10 for supplying a sinusoidal wave voltage $V_o$, and energy-sensitive elements 21 and 22 disposed in opposite portions of the circuit. The energy-sensitive elements 21 and 22 have preferably the same property and may be photoconductive elements such as PbSe or CdSe whose resistance shows a decrease when illuminated with an energy input $L_1$. Neutral impedance elements 31 and 32 which have preferably the same property are disposed in other opposite portions of the circuit. Between load terminals 41 and 42 of the circuit, there is connected an electrically luminescent element 50 such as a known electroluminescent element of, for example, ZnS.

Suppose now that the energy-sensitive elements 21 and 22 have respective resistances $R_1$ and $R_2$. The neutral impedance elements 31 and 32 have respective capacitances $C_1$ and $C_2$, these values having the relation $R_1=R_2=R$ and $C_1=C_2=C$, and the electrically luminescent element 50 has a sufficiently high impedance. Then, a voltage $V_1$ applied across the electrically luminescent element 50 or across the load terminals 41 and 42 is given by $$V_1 = V_0, \text{ and } \theta = 2\tan^{-1}\left(\frac{1}{\omega CR}\right)$$

where $\omega$ is the angular frequency. It will be seen that the power supply voltage $V_1=V_o$ can be applied across the electrically luminescent element 50 without any loss in voltage, and the phase $\theta$ can be controlled as a function of $\omega$, $C$ and $R$.

When therefore, the energy-sensitive elements 21 and 22 are illuminated with an energy signal input $L_1$ which may be light, the resistance $R$ of the photoconductive elements 21 and 22 decrease at the same rate. Consequently, the phase $\theta$ of the voltage $V_1$ applied across the electrically luminescent element 50 leads the phase $\theta$ of the voltage $V_o$ by an amount which is a function of the intensity of the energy input $L_1$ and no variation takes place in the amplitude of $V_1$. This results in a lead in the waveform of the luminous output $L_2$ from the electrically luminescent element 50. The variation in the phase of the output waveform is fully reversible as it is the function of the intensity of the energy input $L_1$.

FIG. 2 shows the relation between the waveforms in actual operation. More precisely, FIG. 2a shows the waveform of the power supply voltage $V_o$, FIG. 2b shows the waveform of the voltage $V_1$ applied across the electrically luminescent element 50, and FIG. 2c shows the waveform of the luminous output $L_2$. In FIGS. 2b and 2c, the solid line represents the waveform when not illuminated with the energy input $L_1$ and the dotted line represents the waveform when illuminated with the energy The $L_1$. The resistance $R$ of the photoconductive elements 21 and 22 is almost infinitely large when these elements are not illuminated with the energy input $L_1$, and $\theta \approx 0$ in the state in which the angular frequency $\omega$ is selected to have a suitably large value. Thus, $V_1$ is substantially in phase with $V_o$.

When now the energy-sensitive elements 21 and 22 are illuminated with the energy input $L_1$, their resistance $R$ decreases and the phase $\theta$ of the voltage $V_1$ makes a lead as shown by the dotted line in FIG. 2b. Accordingly, the phase of the waveform of the luminous output $L_2$ is also advanced from the solid line to the dotted line in FIG. 2c. Referring to FIG. 1, a synchronous motor 62 which rotates in synchronism with the voltage $V_o$ is employed to drive a rotary light chopper 60. The light chopper 60 comprises a rotary disc 61 which has a slit whose light detecting width is preferably narrower than the half period of the voltage $V_o$ and which can detect the light at a frequency which is the same as that of the voltage $V_o$. Thus, the luminous output $L_2$ is chopped by the light chopper 60 so that the light $L_{20}$ passed through the chopper 60 can be taken out as the final output.

By the above arrangement, any variation in the phase $\theta$ responsive to the energy input $L_1$ appears as a corresponding variation in the intensity of the light output $L_{20}$. In this connection, it will be understood that, when the detection timing is so selected as to be adjustable or variable within at least the half period of the voltage $V_o$, the light output $L_{20}$ can be increased or decreased monotonously, or varied in a V-like fashion, in an inverted-V-like fashion or in any other fashion relative to the energy input $L_1$. Furthermore, the brightness range, gamma value and other factors of the light output $L_{20}$ can freely be selected. For example, a V-like characteristic, a monotonously increasing characteristic and a monotonously decreasing characteristic can be obtained when the detection timing is selected at points A, B and C in FIG. 2c, respectively. These characteristics can be made variable or adjustable within a wider range by suitably varying the light detecting width.

It will be recalled that the $\theta$ is the function of $\theta$, $C$ and $R$. Therefore, the frequency of the output voltage $V_o$ at the AC voltage supply 10 may be made variable for further widening the range in which the operating characteristic is variable or adjustable. Furthermore, the operating characteristic may be also made variable or adjustable by arranging in such a manner that the impedance of those elements which are not sensitive to the energy signal input or the capacitance of the elements 31 and 32 in the present embodiment are made variable.

In FIG. 3, there is shown an equivalent circuit of another embodiment of the present invention and a block diagram of means for detecting a variation in the phase of the waveform of a luminous output as a corresponding variation in the intensity of the light output. In the present embodiment, an energy signal input in the form of a DC signal is responded by a shift in the phase of a luminous output. The energy-sensitive luminescent device shown in FIG. 3 comprises a DC signal source 70, known nonlinear inductance elements 23 and 24, and resistance elements 33 and 34 whose resistance is variable when illuminated with an energy input such as light. The resistance elements 33 and 34 may be a photoconductor such as CdSe and are herein variable resistors which are interlocked with each other so that the operating characteristic is adjustable. In order to adjust the operating characteristic of the circuit, the circuit is connected with an AC voltage supply 10 which comprises a variable frequency oscillator 11 and a power amplifier 12 for amplifying the signal voltage supplied from the voltage supply 11. The AC voltage supply 10 supplies an AC voltage $V_o$ to the circuit so that a voltage $V1$ appears across an electrically luminescent element 50 connected between terminals 41 and 42.

Suppose now that the inductance elements 23 and 24 have the same inductance $L$, and the resistance elements 33 and 34 have the same resistance $R$. Then, the amplitude of the voltage $V1$ appearing across the terminals 41 and 42 is equal to that of the power supply voltage $V_o$, and $V1$ lags behind $V_o$ by $$\theta = 2 \tan^{-1} \frac{\omega L}{R}.$$

When, therefore, a DC signal is applied from the DC signal source 70 to the elements 23 and 24 in FIG. 3, the permeability $\mu$ hence the inductance $L$ of these elements is decreased, and as a result, the lag of the phase of $V1$ is advanced more than when there is no DC signal. The electrically luminescent element 50 may be a known electroluminescent element which is represented by a capacitor of low loss in the equivalent circuit and acts to block the direct current. In order to prevent the direct current from being blocked, a resistance element may be connected in parallel with the electrically luminescent element 50. However, such a resistance element having a low resistance would reduce the impedance between the terminals 41 and 42 and adversely affect the phase shifting operation. The present embodiment obviates an undesirable effect as described above by arranging in such a way that an inductance element 80 is connected in parallel with the electrically luminescent element 50 and the parallel circuit consisting of the elements 50 and 80 makes a parallel resonance at the frequency of $V_o$ so as to maintain a high impedance between the terminals 41 and 42.

In this manner, a signal current supplied from the DC signal source 70 controls the phase of the luminous output $L_2$ from the electrically luminescent element 50. In order to derive a light output $L_{20}$ which is variable depending on the phase of the luminous output $L_2$, a light amplifier 90 having a high speed of response is employed in the present embodiment. The light amplifier 90 comprises a series connection of a photoconductive element 91 such as of CdSe whose speed of response is so high as to follow up the pulsed luminous output $L_2$, and an electroluminescent element 92. An AC voltage $V_2$ is applied to the light amplifier 90 from an AC power amplifier 93.

The signal voltage generated by the oscillator 11 is applied to a phase shifter 94 where the voltage is shifted in phase to be supplied to the amplifier 93 as the signal voltage input $V_2$. Therefore, the voltages $V_o$ and $V_2$ have the same frequency. The phase shifter 94 may suitably be adjusted to set up a selected relationship between the phase of the pulsed luminous output $L_2$ and the phase of the voltage $V_2$ so that a variation in the phase of the luminous output $L_2$ can be derived as a variation in the luminous output from the electroluminescent element 92, hence a variable light output $L_{20}$ from the device. The shift in phase of the voltage $V_2$ relative to the voltage $V_o$ may be selected to lie within a range of one period or half period.

It will be understood from the above description that the present invention provides an energy-sensitive luminescent device which comprises two resistance elements disposed in a pair of opposite portions of the circuit, two capacitance or inductance elements disposed in another pair of opposite portions of the circuit, either of said elements disposed in one of the two pairs of opposite circuit portions being sensitive elements whose impedance is variable in response to application thereto of an energy input or signal input, and an electrically luminescent element the phase of the luminous output waveform of which is varied depending on the variation in the impedance of the sensitive elements.

The resistive sensitive element may be a thermistor element, photodiode, piezoresistance element, magnetoresistance element or the like in lieu of the photoconductive element described above. The capacitive sensitive element may be a photo capacitor, pressure-sensitive diode, variable capacitance diode or the like.

The energy-sensitive luminescent device based on the operating principle according to the present invention employs a sensitive element as an important component of the phase shifting circuit as described already so that the sensitive element acts to shift the phase of the luminous output waveform delivered from an electrically luminescent element. In contrast, it has been difficult with a prior art energy-sensitive luminescent device to derive an output having a high brightness and to effect a highly sensitive operation because a sensitive element therein must directly control the power which contributes to the luminescence of an electrically luminescent element.

In accordance with the present invention, the phase of voltage, hence the luminous output waveform can be controlled without the need for power control, which leads to the advantage that the voltage applied to the luminescent element can be utilized at a very high rate. Thus, the luminous output has a high brightness and the operation can be performed with a high sensitivity.

The electrically luminescent element preferably employed in the present invention is not limited to the electroluminescent element referred to in the embodiments, but may be any one of those luminescent elements such as injection-type luminescent elements and semiconductor laser elements which luminesce in response to excitation with an AC voltage.

The device according to the present invention is not only applicable to the detection of an energy signal input but also to the modulation of the phase of luminous output depending on an energy signal input, telemetering, and telecommunication employing a semiconductor laser element as the luminescent element. Also, the present invention finds its various useful applications in the field of optoelectronics.

It is apparent that the circuitry of the present invention is in no way limited to those illustrated in the embodiments but may be practiced in various other ways on the basis of the principle of the present invention.

It will be understood further that the device according to the present invention is in no way limited to the embodiments in which a single energy-sensitive luminescent element is employed. The present invention includes a luminescent device of planar structure which comprises a plurality of such luminescent elements arranged in a two-dimensional fashion.

It will be appreciated that the present invention provides a novel and useful luminescent device in which the phase of an AC voltage applied to an electrically luminescent element is varied by an energy signal input and the resultant variation in the phase of the luminous output from the electrically luminescent element is converted into a corresponding variation in the intensity of light by means such as a light chopper. Therefore, the intensity of the light output can be varied without varying the voltage or power applied to the electrically luminescent element.

I claim:

1. An energy-sensitive luminescent device comprising a bridge circuit of which each of two opposite arms comprises an energy-sensitive element and each of the remaining two opposite arms comprises a reactive element, an electrically luminescent element connected between an opposite pair of junction points of said energy-sensitive elements and said reactive elements, an AC power source connected between the other opposite pair of junction points, said energy-sensitive element and said AC power source being connected in such a manner that the phase of the voltage across said electrically luminescent element is shifted in response to a variation in the impedance of said energy-sensitive element due to an energy signal applied thereto; and converting means for receiving a luminescent output from said electrically luminescent element and producing a luminous output the intensity of which varies in accordance with the variation in the phase of said luminescent output emitted from said electrically luminescent element.

2. An energy-sensitive luminescent device according to claim 1, wherein an inductance element is connected in parallel with said electrically luminescent element to constitute a parallel resonance circuit with the capacitive component of said electrically luminescent element.

3. An energy-sensitive luminescent device comprising circuit means including an electrically luminescent element as the load and at least one energy-sensitive element; an AC power source connected with said circuit means to energize said electrically luminescent element; said electrically luminescent element, said energy-sensitive element and said AC power source being connected in such a manner that the phase of the voltage across said electrically luminescent element is shifted in response to a variation in the impedance of said energy-sensitive element due to an energy signal applied thereto; and converting means comprising a light chopper rotated in synchronization with the alternating voltage of said AC power source for receiving a luminescent output from said electrically luminescent element and producing a luminous output the intensity of which varies in accordance with the variation in the phase of said luminescent output emitted from said electrically luminescent element.

4. An energy-sensitive luminescent device comprising circuit means including an electrically luminescent element as the load and at least one energy-sensitive element; an AC power source connected with said circuit means to energize said electrically luminescent element; said electrically luminescent element, said energy-sensitive element and said AC power source being connected in such a manner that the phase of the voltage across said electrically luminescent element is shifted in response to a variation in the impedance of said energy-sensitive element due to an energy signal applied thereto; and converting means for receiving a luminescent output from said electrically luminescent element and producing a luminous output the intensity of which varies in accordance with the variation in the phase of said luminescent output emitted from said electrically luminescent element, wherein said converting means comprises a light amplifier comprising a photoconductive element and a second electroluminescent element, said light amplifier being energized by an AC power source in a predetermined synchronized relationship with the AC power source for energizing said load electrically luminescent element.